Oct. 28, 1930.  T. J. McCORMICK  1,779,913
TIRE COVER
Filed Feb. 13, 1928   2 Sheets-Sheet 1
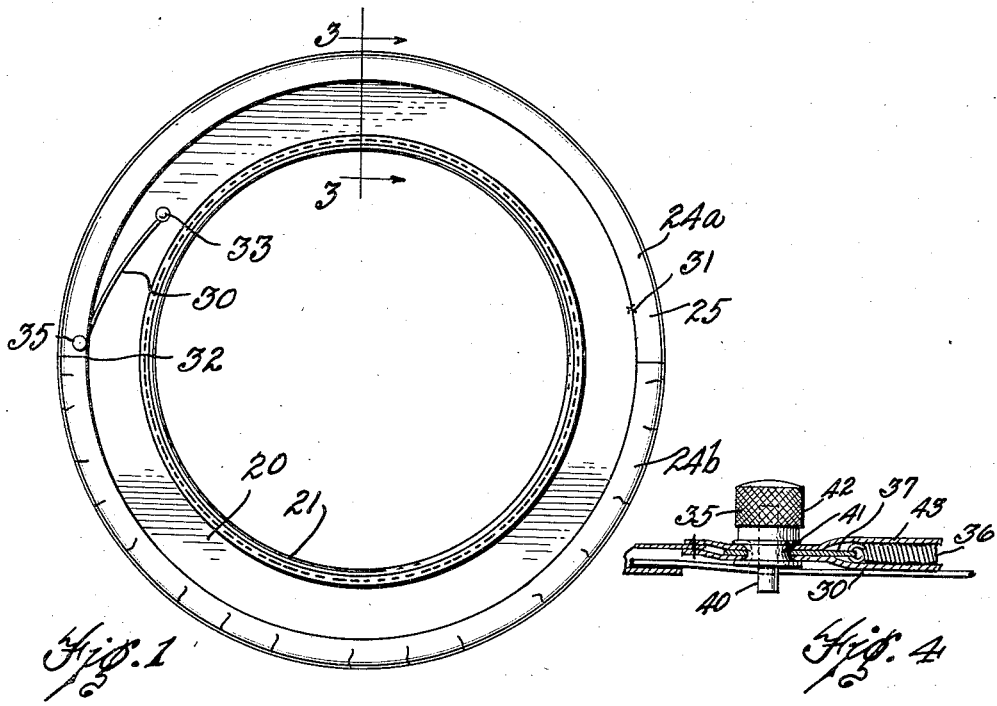
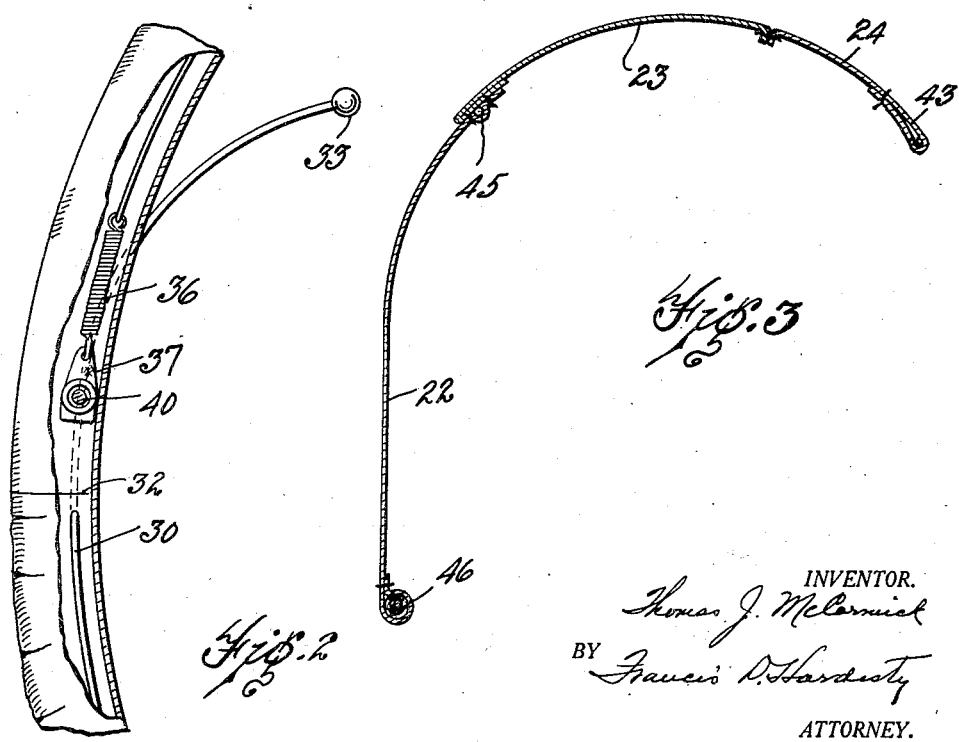
INVENTOR.
Thomas J. McCormick
BY Francis D. Hardisty
ATTORNEY.

Oct. 28, 1930.　　T. J. McCORMICK　　1,779,913
TIRE COVER
Filed Feb. 13, 1928　　2 Sheets-Sheet 2
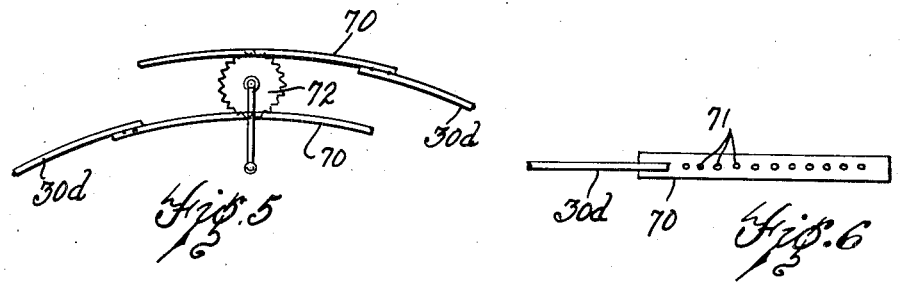
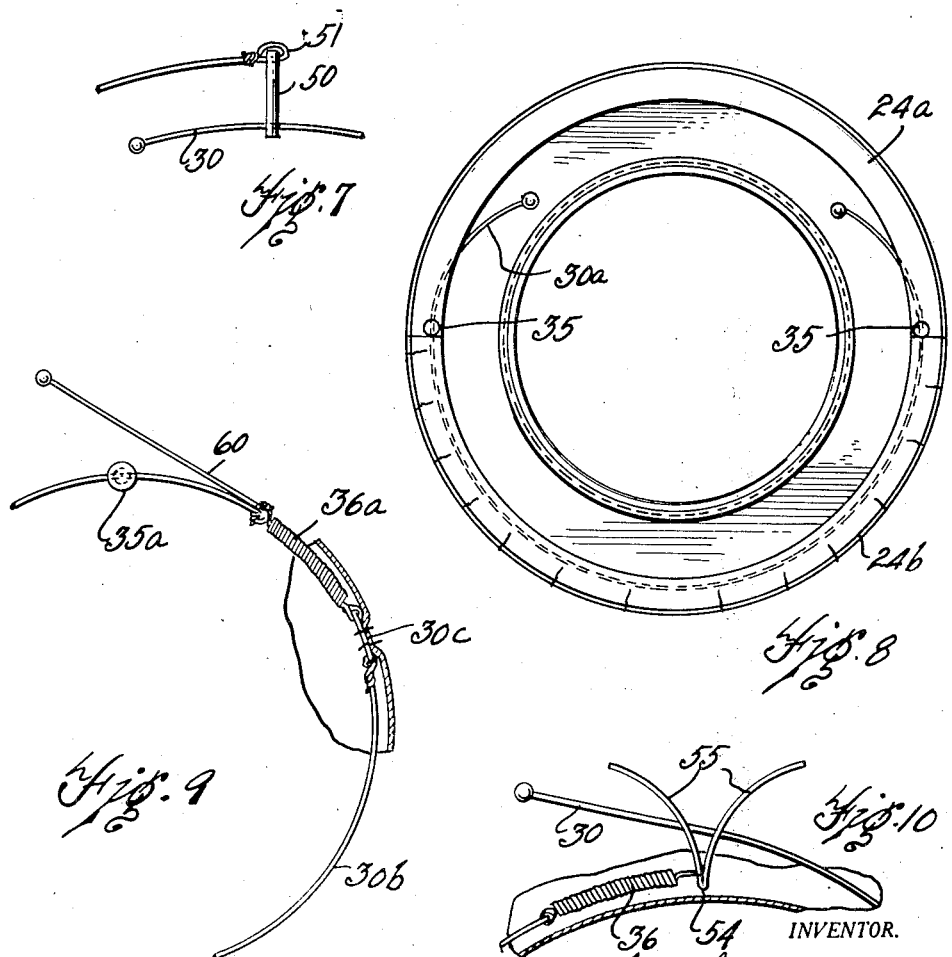
INVENTOR.
Thomas J. McCormick
BY
Francis D. Hardesty
ATTORNEY.

Patented Oct. 28, 1930

1,779,913

UNITED STATES PATENT OFFICE

THOMAS J. McCORMICK, OF DETROIT, MICHIGAN

TIRE COVER

Application filed February 13, 1928. Serial No. 253,931.

The present invention relates to tire covers and more particularly to means for fastening the free edge or edges of the same.

The conventional tire cover which is most widely used at present, consists of a circular piece of fabric which may be a disk or which may have its central portion cut out to leave an annulus having one or more strips of fabric sewed to its outer edge and adapted to extend over the tread of the tire and have the free edge contracted by suitable means to hold the cover in place on the tire.

The conventional cover has in its free edge which is to be contracted, usually a continuous ring of either elastic cord or a coil spring. In such covers, it is usual to use a spring or elastic ring of sufficient strength to stretch the tread covering strips tightly over the tire tread so as to make it present a comparatively smooth appearance.

In such covers, using such elastic rings, it is sometimes quite difficult to apply the cover to the tire so as to have it present the smooth appearance that is desirable because of the resistance offered by the ring. It is also sometimes quite difficult to remove these covers from the tire for the same reason, as the ring causes the free edge to press tightly against the tire and particularly in the larger sizes wherein quite strong springs are used, this difficulty is quite noticeable.

Among the objects of the present invention is to provide means for securing this free edge in proper position without the necessity of having to overcome the resistance of the spring rings and to provide for easy application and removal of the cover.

Other objects will readily occur to those skilled in the art upon reference to the following description and the accompanying drawings, in which:—

Figure 1, shows a tire cover with the tire therein and including one embodiment of the present invention;

Figure 2, is an enlarged view of a portion of Figure 1 with part of the cover removed to show the construction;

Figure 3, is a section on line 3—3 of Figure 1;

Figure 4, is an enlarged view of a part of Figure 2 with parts in section;

Figures 5 and 6 are two more or less diagrammatic views showing a modified form of the device;

Figure 7 illustrates a second modification of the fastening means;

Figure 8 is a view of a cover similar to Figure 1 showing another embodiment of the structure of Figure 1;

Figures 9 and 10 are diagrammatic views of other modifications of the fastening means.

The present invention is particularly suitable for such tire covers as are described in my copending application, Serial Number 251,039, filed February 1, 1928, on tire covers, but is also adaptable to other forms of cover.

In the prior application a tire cover is described in which the face piece or circular fabric member of the cover is maintained in a distended and smooth condition by means of a comparatively stiff ring sewed into its edge and therefore does not need to be stretched tightly over the tread of the tire in order that the cover may present a smooth appearance. Because of this lack of necessity for stretching the cover, it has been found that very light springs or a non-elastic element may be used in the free edge of the cover to contract the same and still have a cover which will lie smoothly over the tire. Such an element is indicated in the present application and shown in the drawings.

Referring now to the drawings, a tire 20 mounted upon a suitable rim 21, is indicated in Figure 1 as covered by a cover indicated as a whole by the numeral 25. This particular cover comprises a circular face piece 22 having sewed to its edge the tread piece 23 and having a second strip 24 sewed to the edge of the strip 23. In the particular cover shown, about one half of the strip 24 will be cut so as to fit the half of the tire tread. This part of the strip is indicated at 24$^a$. The other half 24$^b$ of the strip is separate from the portion 24$^a$ and cut in alignment with the cloth and of a length equal to half of the periphery of the cover. This portion 24$^b$ of the strip 24 will therefore permit expansion and contraction in order to put on the cover and secure it in place. This operation is accomplished by means of a wire 30 which may extend completely around the free edges of the parts 24ª and 25ᵇ or may be secured at say about the point 31 on strip 24ª and extend along the free edge of part 24ᵇ to and beyond the junction 32 between the two strip portions.

This free end of wire 30 will be provided with a suitable enlarged end 33 to permit easy manipulation of the wire and to prevent the end entering the hem in which the wire will lie or passing the fastener.

In Figures 1 to 4, the anchored end of the wire is at the fastening means 35 and extends completely around the cover and at its anchored end is connected to a short piece of spring 36, which, in turn, is connected to a tab or link 37 serving to connect the spring to the fastening means. The free end 33 of the wire extends beyond the fastening means for a distance of six or eight inches when the cover is in place, or a sufficient distance to permit fully opening the cover without the free end of the wire disappearing into the hem.

The fastening means consists in the present modification, of a screw stud 40 passing through a grommet 41 and provided at its inner end with an opening for the passage of wire 30. The other end of the stud 40 is threaded into a suitable thumb nut 42, which, when rotated, draws the stud 40 through the grommet and presses the wire tightly against the lower side thereof so as to fix it in position. The grommet passes through the hem 43 of the cover and serves to hold the fastening means and likewise to anchor the link piece 37 holding the end of wire 30 or the end of spring 36.

In the use of this particular cover in placing it on the tire, the wire 30 will be pushed into the hem 43 sufficiently to spread open the portion 24ᵇ of the securing strip. The upper half of the cover with the formed strip 24ª will then be placed over the tire and when this has been done, the open half may be easily pulled over the lower part of the tire. When the cover is thus in position, the wire 30 will be drawn out of the hem so as to draw the portion 24ᵇ of the securing strip tightly over the tire and contract it sufficiently to hold the cover in place. The nut may then be tightened to hold the wire.

One advantage of this particular type of fastening means is that it may be used to hold the cover open as well as hold it closed.

While a short piece of spring 36 has been shown as interposed in the length of wire 30, this will not be necessary in most cases, but is desirable when the covers are being made of rather heavy stiff fabric.

Figure 3 shows one of the features referred to as being covered by the preceding application. In this figure, a distending element is shown at 45 in the form of a piece of spring wire and at 46 is indicated a cord serving to maintain the form of the opening in the circular face piece of the cover.

Figure 8, shows a tire cover similar to that of Figure 1, except that a piece of wire 30ª is used, which is of a length just a little more than half the periphery of the free edge of the cover. In this cover, the same portions 24ª and 24ᵇ of the securing strip are shown and two fastening means 35 are used, one at each end of the strip 24ª. One advantage of this type of cover is that the strip 24ᵇ may be contracted from both ends and a somewhat more uniform contraction obtained thereby.

Figures 7 and 10 show fastening means adapted to be used as the equivalent of the fastening means 35. In Figure 7, the anchored end of wire 30 is shown as connected to a short piece of metal rod 50 provided with an eye in each end. The free end of wire 30 passes through one of these eyes and the other end of the wire is looped through the other eye and fastened, as indicated at 51. In this particular device so long as the piece 50 is held in a radial position with respect to the cover, the wire 30 will pass freely through its eye but as soon as the piece 50 is allowed to move angularly out of such radial position, the wire 30 will be held firmly.

In Figure 10, the free end of wire 30 is shown as passing through openings in a flat piece of spring steel 54 which has been back upon itself as at 53 to form a V with the openings registered, and having the two sides 55 of the V curved outwardly so that by pressing them together, the openings mentioned will align and permit the wire to pass freely therethrough. However, as soon as the pressure is relieved, the sides 55 will spread apart and the wire will be gripped. In this figure, the short connecting spring 36 is shown as anchored to the flat steel spring near the apex 53 thereof.

Figure 9, shows a somewhat modified form of the device in which the continuous ring 30ᵇ is used with a short piece of spring 36ª interposed therein. This ring 30ᵇ will be anchored at a suitable point, as at 30ᶜ, and a fastening device indicated at 35ª located a short distance from the anchoring means will be used.

In addition a second piece of wire 60 will be connected to that end of spring 36ª nearest the fastener 35ª and extending to the outside of the containing hem near the latter. In this form of the device the fastener may be used only to hold open the cover after the ring has been enlarged by stretching spring 36ª.

Figure 5 shows still another form of spreader and contractor in which the contracting wire 30ᵈ will be free in the hem and have at each end a rack piece 70, preferably narrow strip of metal having perforations 71 acting as teeth. Coacting with these strips or racks 70 will be a gear 72 mounted in suitable fashion at a suitable point on the hem of the cover, and rotatable to expand or contract the ring 30$^d$.

Now having described the invention and the preferred forms of embodiment thereof it is to be understood that the said invention is to be limited, not by the specific disclosure herein but only by the scope of the claim which follows.

I claim:—

In a tire cover having a free edge adapted to be expanded and contracted to permit entering and maintaining a tire therein, a length of smooth spring wire enclosed in said edge with one end extending therefrom, means for fixing the other end to said edge, and clamping means fixed to said edge near the free end of said wire where it protrudes from said edge and adapted to secure said wire in longitudinally adjusted position.

THOMAS J. McCORMICK.